United States Patent
Riley

(10) Patent No.: US 10,255,932 B1
(45) Date of Patent: Apr. 9, 2019

(54) PREAMP MODE STATUS DIAGNOSTIC

(71) Applicant: Seagate Technology LLC, Cupertino, CA (US)

(72) Inventor: Dale T Riley, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/016,342

(22) Filed: Jun. 22, 2018

(51) Int. Cl.
- *G11B 20/20* (2006.01)
- *G11B 5/09* (2006.01)
- *G11B 5/455* (2006.01)
- *G11B 5/00* (2006.01)

(52) U.S. Cl.
CPC ............... *G11B 5/09* (2013.01); *G11B 5/455* (2013.01); *G11B 2005/0016* (2013.01)

(58) Field of Classification Search
CPC ........... G11B 27/36; G11B 5/09; G11B 20/10; G11B 5/02; G11B 20/10027; G11B 20/0013
USPC .................................. 360/31, 39, 46, 67, 68
See application file for complete search history.

(56) References Cited

U.S. PATENT DOCUMENTS

| | | |
|---|---|---|
| 5,589,777 A | 12/1996 | Davis et al. |
| 6,879,454 B2 | 4/2005 | Winarski et al. |
| 9,240,199 B2 * | 1/2016 | Song ................. G11B 5/09 |
| 2007/0236819 A1 | 10/2007 | Hashizume |
| 2014/0063639 A1 | 3/2014 | Dean |

OTHER PUBLICATIONS

Integrated Circuits, "Pre-Amplifier for Hard Disk Drive with MR-Read / Inductive Write Heads", Philips Semiconductors, TDA5360, Jul. 1998, 34 pgs.
Integrated Circuits,"Pre-amplifier for Hard Disk Drive (HDD) with MR-read/inductive write heads", Philips Semiconductors, TDA5155, Apr. 1997, 24 pgs.

* cited by examiner

*Primary Examiner* — Nabil Z Hindi
(74) *Attorney, Agent, or Firm* — Cesari & Reed, LLP; Kirk A. Cesari

(57) ABSTRACT

An apparatus may include a preamplifier configured to implement multiple operational modes and configured to be connected to a magnetic read/write head, wherein the magnetic read/write head includes a read sensor to read data from a disk and a write element to write data to the disk. The preamplifier may further include an input configured to receive a test mode control signal to activate a mode monitoring mode of one or more test modes of a test mode circuit of the preamplifier, the test mode circuit configured to determine an indicator of the current operational mode of the preamplifier, and an output to provide the determined indicator of the current operational mode of the preamplifier.

20 Claims, 3 Drawing Sheets

PREAMP MODE STATUS DIAGNOSTIC

SUMMARY

In certain embodiments, an apparatus may include a preamplifier configured to implement multiple operational modes and configured to be connected to a magnetic read/write head, wherein the magnetic read/write head includes a read sensor to read data from a disk and a write element to write data to the disk. The preamplifier may further include an input configured to receive a test mode control signal to activate a mode monitoring mode of one or more test modes of a test mode circuit of the preamplifier, the test mode circuit configured to determine an indicator of a current operational mode of the preamplifier, and an output to provide the determined indicator of the current operational mode of the preamplifier.

In certain embodiments, a system may include a preamplifier configured to implement multiple operational modes and configured to be connected to a magnetic read/write head, wherein the magnetic read/write head includes a read sensor to read data from a disk and a write element to write data to the disk. The preamplifier may be further configured to receive a test mode control signal to activate a mode monitoring mode of one or more test modes of a test mode circuit of the preamplifier, receive a monitored mode of the multiple operational modes to be monitored, and determine, by the test mode circuit, an indicator of a current operational mode of the preamplifier at least in part by determining whether the current operational mode of the preamplifier is the monitored mode of the multiple operational modes. The preamplifier may then output the determined indicator of the current operational mode of the preamplifier.

In certain embodiments, a method may include receiving, by a preamplifier configured to implement multiple operational modes, a control signal indicating a current operational mode for the preamplifier, the preamplifier configured to be connected to a magnetic read/write head, wherein the magnetic read/write head includes a read sensor to read data from a disk and a write element to write data to the disk. The method may then include applying, by the preamplifier, a signal processing to a read signal from the read sensor based on the current operational mode, receiving, by the preamplifier, a test mode control signal to activate a mode monitoring mode of one or more test modes of a test mode circuit of the preamplifier, and receiving, by the preamplifier, a monitored mode of the multiple operational modes to be monitored by the a test mode circuit. The method may then determine, by the test mode circuit, an indicator of the current operational mode of the preamplifier at least in part by determining whether the current operational mode of the preamplifier is the monitored mode of the multiple operational modes and output, by an output of the preamplifier, the determined indicator of the current operational mode of the preamplifier.

DETAILED DESCRIPTION

Figure 1:
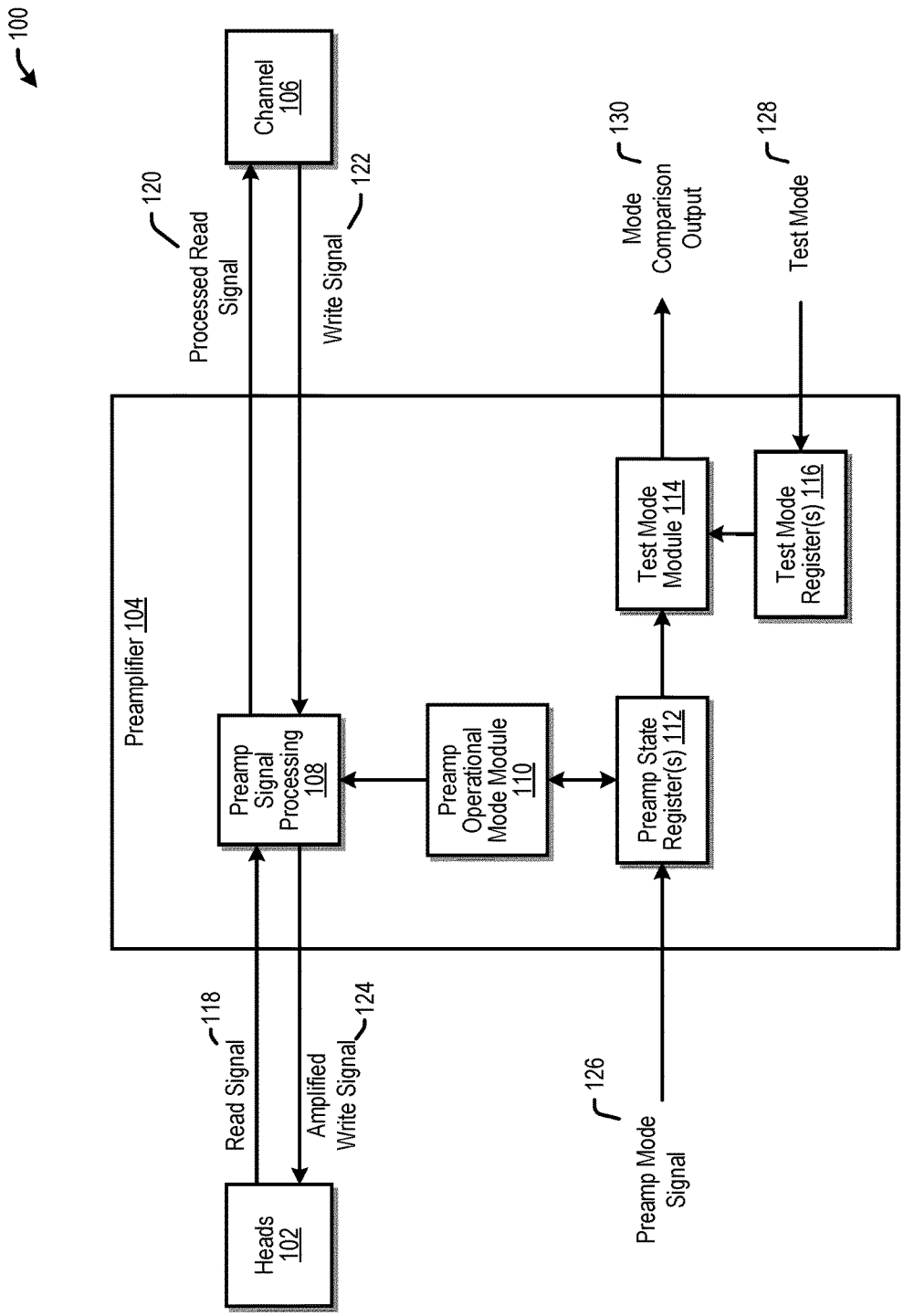
FIG. 1 is a block diagram of a system architecture which may include a preamplifier including a mode monitoring mode, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disk drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure generally relates to magnetic recording systems. In such systems, the hard drive preamplifier (or preamp) may route read data from one or more sensors through the preamplifier to a channel located on the hard disk drive's printed circuit board assembly (PCBA). The preamplifier may also perform processing such as analog filtering and applying a gain on the read signal. The preamplifier may be configured to operate in multiple operational modes. Further, some embodiments may further be configured to operate in one or more preamp based diagnostic test modes that may be used to perform diagnostic testing of the preamp during the operational modes.

In some embodiments according to this disclosure, the diagnostic test modes may include an operational mode monitoring test mode (also referred to herein as "mode monitoring mode") which may monitor the current operational mode of the preamp (e.g., Sleep, Standby, Idle, Read, Write, etc.).

For example, the mode monitoring mode may be configured to post the current operational mode to one or more output pins of the preamp (e.g., fault/Test MUX output pins). Such a mode monitoring mode may show the operational preamp modes dynamically with DFCTL (Dummy/Fast or Power Save Mode Control select registers & mode control circuits), power save input pin state and preamp mode control registers, potentially without having to manually match register writes with power chop pin timing. This may allow verification of the operational preamp mode in real time. More particularly, the real time monitoring of the operational preamp mode may allow real time failure analysis of operational preamp modes. This may make drive development and failure analysis at the drive system level significantly easier, allowing real time mode status output, rather than monitoring multiple hardware lines and decoding preamp control register serial port commands against time.

Rather, the mode monitoring mode may provide a single scope trace output of a desired mode condition.

In some embodiments, the mode monitoring mode may determine whether the preamp is in an identified operational mode and output an indication of the result of the determination. For example, the preamp may be configured to receive an input that may identify an operational mode (e.g. a monitored mode). Then, during operation, the mode monitoring mode may be configured to output a logical high to an output pin when the preamp is in the identified operational mode and a logical low to the output pin when the preamp is in another operational mode (or vice versa).

Referring to FIG. 1, a block diagram of a system architecture which may include a preamplifier including a mode monitoring mode is shown and is generally designated 100. More particularly, FIG. 1 may illustrate an example embodiment of a hard drive that may include a preamplifier including a mode monitoring mode that may monitor the current operational mode of the preamp.

The components of system 100 may include one or more heads 102 coupled to a preamplifier 104. Further, the preamplifier 104 may be coupled to a channel 106. The preamplifier 104 may include a preamp signal processing module 108 coupled to a preamp operational mode module 110. The preamp operational mode module 110 may be coupled to one or more preamp state registers 112 which may also be coupled to a test mode module 114. The test mode module 114 may further be coupled to one or more test mode registers 116. Each of the heads 102, the preamplifier 104, the channel 106, the preamp signal processing module 108, the preamp operational mode module 110, the one or more preamp state registers 112, the test mode module 114, and the one or more test mode registers 116 may be a separate circuit, a system on chip (SOC), firmware, a processor(s), or other system not listed, or any combination thereof.

The heads 102 may include a read sensor (such as a magneto-resistive (MR) element) that senses the magnetic fields, for example, on a platter of a hard disk drive. In operation, a read sensor of the heads 102 may produce a continuous time read signal 118. The operation of the read sensor may be controlled by the preamp 104 (e.g. depending on the operational mode of the preamp 104). The read sensor of the heads 102 may then output the read signal 118 to the preamp 104.

The preamp signal processing module 108 may process the read signal 118 based on parameters provided by the preamp operational mode module 110 to produce a filtered and gain-adjusted continuous time processed read signal 120 which may in turn be provided to the channel 106. For example, in operation, the preamp signal processing module 108 may receive a continuous-time read signal and perform processing such as analog filtering and applying a gain to produce a processed read signal. Depending on the implementation, a variety of processing may be performed (e.g. bias, gain, and bandwidth processing).

The channel 106 may process the filtered and gain-adjusted continuous time processed read signal 120. Depending on what operation is being performed generally, the processing by the channel 106 may differ. In some examples, during read operations, the read portion of the channel 106 may convert the analog processed read signal 120 to a digital signal. The converted signal may then be detected and decoded to recover the data written on the hard disk drive.

During a write operation, the write portion of a channel 106 may encode the data to be written onto a storage medium. For example, the channel 106 may process the signal for reliability and may include, for example error correction coding (ECC), run length limited coding (RLL), and the like. The channel 106 may then output write signals 122 to the preamp 104 when writing data.

While writing data, the preamp 104 may amplify the write signals 122. The amplified write signals 124 may be output to the write portion of the head 102.

The head 102 may include a write element or write coil such as an inductor that may generate a magnetic field. While writing data, a write current may flow through the write element of the head 102 that is switched to produce a magnetic field having a positive or negative polarity. The positive or negative polarity may be stored by the hard drive platter and may be used to represent data.

Returning to the preamp 104, the preamp operational mode module 110 may output parameters to the preamp signal processing module 108 based on the current operational mode of the preamp which may be stored in the one or more preamp state registers 112. The current operational mode stored in the one or more preamp state registers 112 may be received from a controller or other device outside of the preamp 104 as the preamp mode signal 126 or may be stored to the one or more preamp state registers 112 by the preamp operational mode module 110.

Depending on the implementation, the current operational mode stored in the one or more preamp state registers 112 may be a collection of states of the current operation of the preamp or an operational mode identifier. In embodiments in which the current operational mode is a collection of the states of the current operation of the preamp 104, the one or more preamp state registers 112 may be collection of various state registers throughout the preamp. Further, in some embodiments, the states of the current operation may include values on input lines which are not stored in the preamp.

The operational modes may vary depending on the particular embodiment. Examples of operational modes are provided below in Table 1.

The test mode module 114 may be configured to operate in one or more diagnostic test modes which may include a mode monitoring mode which may monitor the current operational mode of the preamp 104. A current diagnostic test mode may be stored in the one or more test mode registers 116. The current diagnostic test mode stored in the one or more test mode registers 116 may be received from a controller or other device outside of the preamp 104 as the test mode signal 128.

In the mode monitoring mode, the test mode module 114 may operate to compare the current operational mode stored in the one or more preamp state registers 112 with a current monitored mode that may be stored in the one or more test mode registers 116 and the logical result of the comparison may be output as the mode comparison output 130 (e.g. as a logical bit value).

For example, in embodiments in which the current operational mode stored in the one or more preamp state registers 112 is an operational mode identifier, the operational mode identifiers may utilize the same values as the current monitored mode. In such an embodiment, the current operational mode stored in the one or more preamp state registers 112 may be directly compared to the current monitored mode.

In embodiments in which the current operational mode stored in the one or more preamp state registers 112 is a collection of the states of the current operation of the preamp 104, the test mode module 114 may be configured to lookup or determine the preamp operational states associated with the current monitored mode and compare the values of the states of the current operation of the preamp 104 to the preamp operational states associated with the current monitored mode. If the states of the current operation match the states of the current monitored mode, the test mode module 114 may be configured to output a logical high to an output pin as the mode comparison output 130. Similarly, if the states of the current operation does not match the states of the current monitored mode, the test mode module 114 may be configured to output a logical low to the output pin as the mode comparison output 130.

An example of a mapping of a set of operational modes and corresponding states of operation of the preamp to monitored mode identifiers is shown in Table 1.

Further, embodiments are not limited to systems and methods which provide a logical yes or no regarding whether a particular monitored mode is active. For example, some embodiments may determine the operational mode from the current operational state of the preamp and post an operational mode identifier to an output of the preamp. Other embodiments may provide for multiple outputs and a corresponding number of monitored modes. In such an embodiment, the test mode module 114 may perform the above described operations for each monitored mode and output the result to the corresponding output.

Further, not all operational modes may be valid monitored modes. For example, some modes, like a sleep mode may

TABLE 1

Mode Mapping

| | Inputs | | | | Preamplifier States | | | |
|---|---|---|---|---|---|---|---|---|
| Mode_Stat[4:0] | PWR_SAVE | DFCTL | WTR_OFF | WRn Pin | Chip Bias | Writer | Reader | Preamp Mode Status |
| 00000 | 1 | 10 | NA | 0/1 | Off | Off | Off | Hardware Sleep |
| 00001 | NA | NA | NA | NA | Active | Off | Off | Mode[1:0] = 01: Preamp Idle |
| 00010 | 0 | xx | 0 | 0 | Active | Idle | On | Read with Writer Idle |
| 00011 | 0 | xx | 1 | 0 | Active | Off | On | Read with Writer Off |
| 00100 | 0 | *01 | 0 | 1 | Active | On | Idle | Write with Reader On |
| 00101 | 0 | 01 | 0 | 1 | Active | On | On | Read during Write |
| 00110 | 1 | 00 | 0 | 0 | Active | Idle | Standby | Writer Idle/Reader Standby |
| 00111 | 1 | 00 | 1 | 0 | Active | Off | Standby | Writer Off/Reader Standby |
| 01000 | 1 | 00 | 0 | 1 | Active | Active | Standby | Write with Reader Standby |
| 01001 | 1 | 01 | 0 | 0 | Active | Idle | Idle | Idle with Fast Reader Bias |
| 01010 | 1 | 01 | 1 | 0 | Active | Off | Idle | Idle with Writer Off, Fast Reader Bias |
| 01011 | 1 | 01 | 0 | 1 | Active | On | Idle | Write with Reader Idle, Fast Reader Bias |
| 01100 | 1 | 10 | 0 | 1 | Active | On | Idle | Write with Hardware Sleep |
| 01101 | 1 | 11 | 0 | 0 | Active | Idle | Idle | Writer/Reader Idle |
| 01110 | 1 | 11 | 1 | 0 | Active | Off | Idle | Writer Off/Reader Idle |
| 01111 | 1 | 11 | 0 | 1 | Active | On | Idle | Write with Reader Idle |
| 01000 | | | | | | | | Available Modes for Supplier Definition |
| . | | | | | | | | |
| . | | | | | | | | |
| . | | | | | | | | |
| 11111 | | | | | | | | |

More particularly, Table 1 shows a mapping of states for sixteen (16) preamp operational modes to monitored mode identifiers (e.g. the 5 bit Mode_Stat value). As previously noted and shown in Table 1, the states of operation of the preamp may include values associated with input lines such as PWR_SAVE and DFCTL as well as stored register values such as chip bias.

In an example operation, the test mode module 114 may determine the current monitored mode is identified in the test mode register(s) 116 as 01000. This identifier corresponds to the "write with reader standby" operational mode. Based on this, the test mode module 114 may determine whether the current state of the operation of the preamp 104 is PWR_SAVE=1; DFCTL=00; WTR_OFF=0; WRn Pin=1; Chip Bias=Active; Writer=Active; and Reader=Standby. If so, the test mode module 114 may output a logical high for the mode comparison output 130; otherwise, the test mode module 114 may output a logical low for the mode comparison output 130 (or vice versa).

It should be noted that embodiments according to this disclosure are not limited to the particular embodiment shown in FIG. 1 and may include many variations and architectures performing similar functions. For example, systems and methods according to this disclosure are not limited to any particular kind of preamp or to any particular type of technology.

preclude the mode monitoring operations (e.g. sleep mode may preclude operations by the test mode module because the preamp is asleep).

Figure 2:
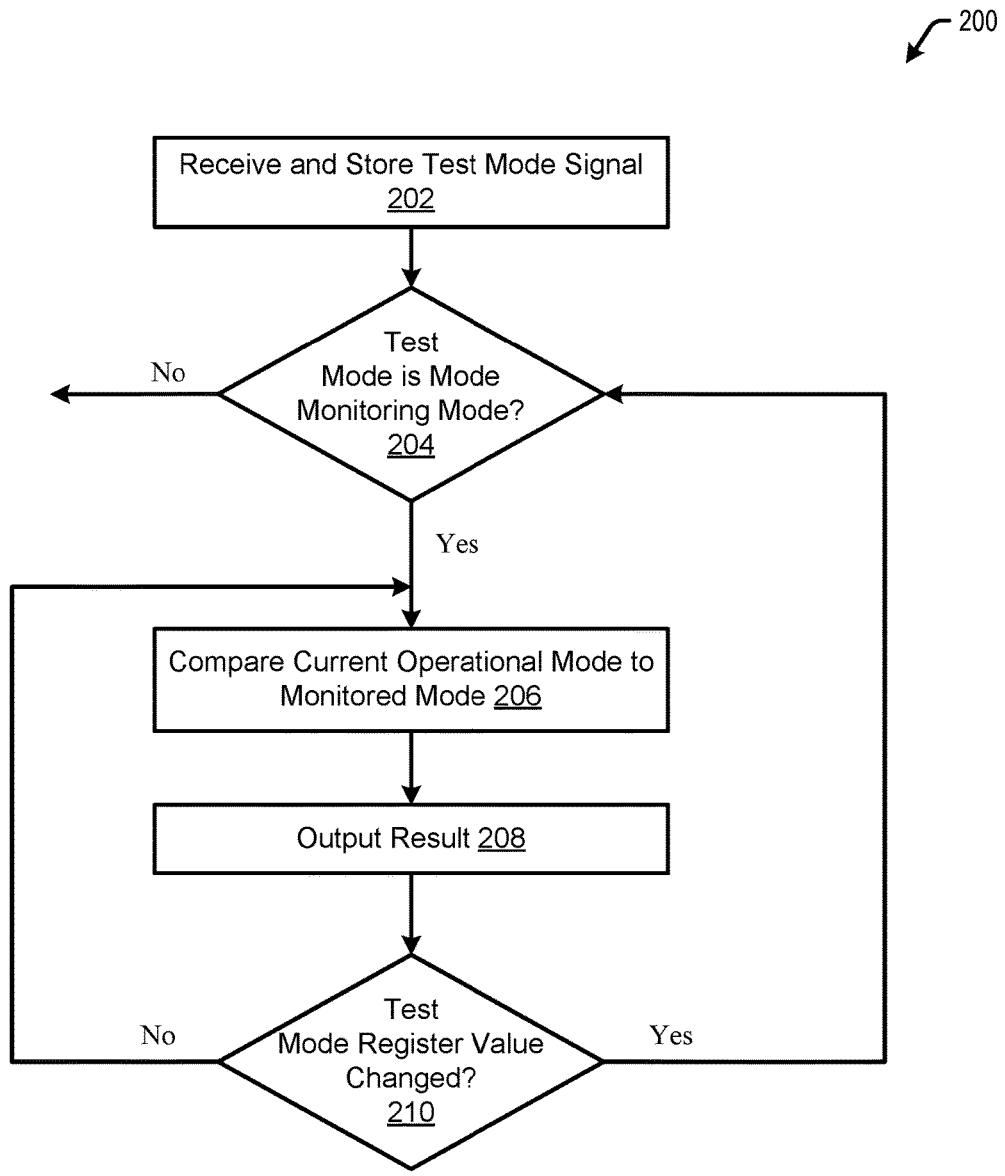
FIG. 2 is a flowchart of a method that may provide for preamplifier mode monitoring, in accordance with certain embodiments of the present disclosure.

Referring to FIG. 2, a flowchart of a method that may provide for preamplifier mode monitoring is shown and is generally designated 200. More particularly, flowchart 200 may be a flow of operations of the systems 100 detailed above with respect to FIG. 1.

In operation, the system may receive a test mode signal and store the test mode signal in one or more test mode register at 202. For example, the system may receive and store a test mode signal that may set the current test mode to the mode monitoring mode and which may specify a monitored mode as discussed above.

At 204, the system may determine whether the current test mode is the mode monitoring mode. If not, the system may continue to another test mode operation or wait for the test mode to change. If so, the system may continue to 206.

At 206, the system may compare the current operational mode of the preamp to a monitored mode specified in the test mode register. Depending on the particular implementation and whether and how the current operational mode of the preamp is stored, the comparison operation may vary. Examples comparison operations which may be performed at 206 are discussed above for various embodiments with respect to FIG. 1.

At 208, the system may output the result of the comparison. As discussed above, in some embodiments, the result may be posted to one or more output pins of the preamp which may be connected to a controller of the preamp (e.g. a controller of a hard disk drive including the preamp) or to an external system (e.g. a host, a diagnostic testing system, etc.).

At 210, the system may determine whether the test mode register value has changed. If not, the process may return to 206 such that the monitoring operation continues. Otherwise, the process may return to 204 and may either exit the mode monitoring mode or continue the mode monitoring mode with updated parameters.

Many variations would be apparent in view of this disclosure. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 3:
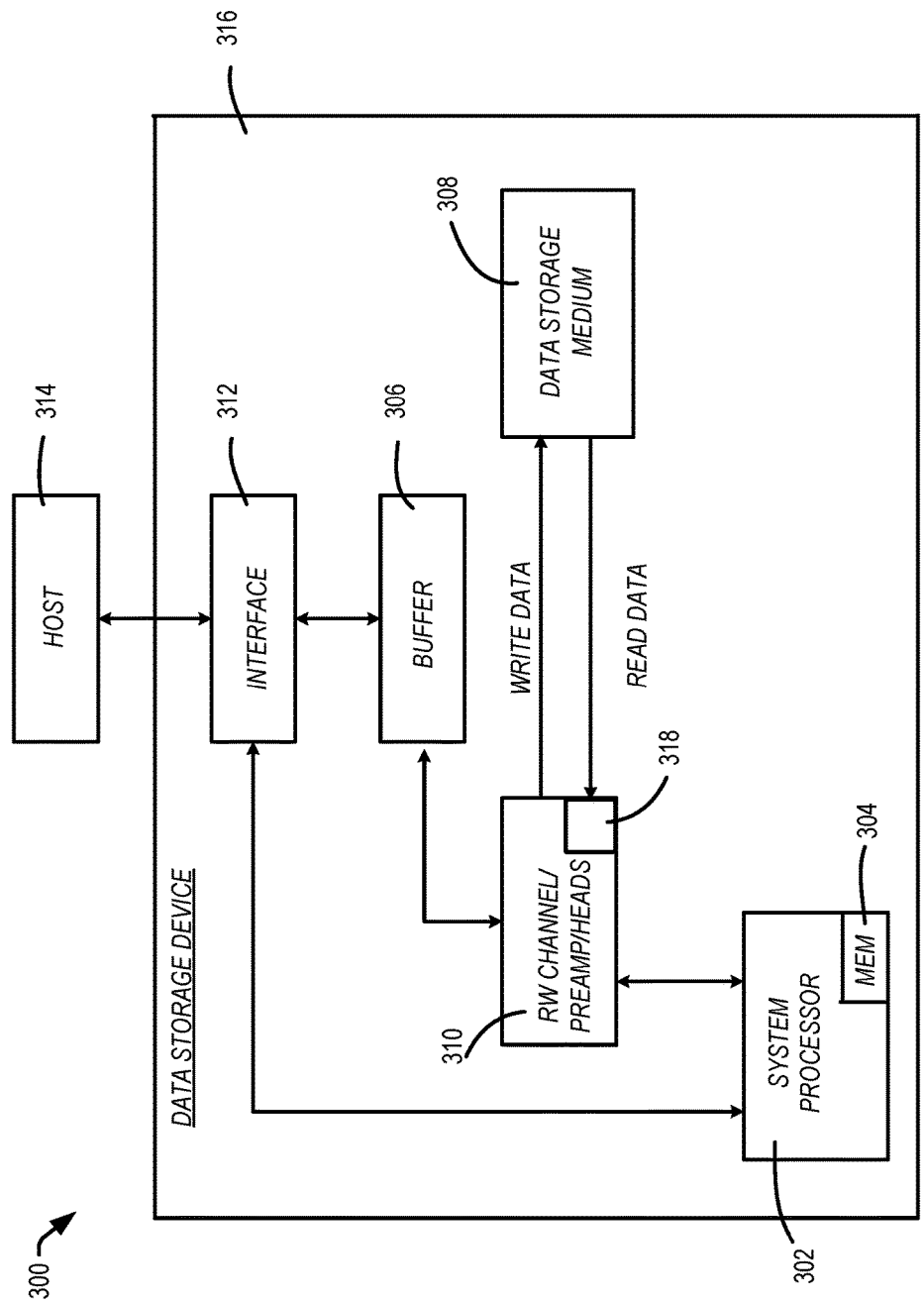
FIG. 3 is a block diagram of a system including a magnetic recording system architecture which may include preamp mode monitoring functionally, in accordance with certain embodiments of the present disclosure.

Referring to FIG. 3, a block diagram of a system including a magnetic recording system architecture which may include preamp mode monitoring functionally is shown and generally designated 300. The system 300 can be an example of a data storage device (DSD), and may be an example implementation of system 100. The DSD 316 can optionally connect to and be removable from a host device 314, which can be a device or system having stored data, such as a desktop computer, a laptop computer, a server, a digital video recorder, a photocopier, a telephone, a music player, other electronic devices or systems not listed, or any combination thereof. The data storage device 316 can communicate with the host device 314 via the hardware/firmware based host interface circuit 312 that may include a connector (not shown) that allows the DSD 316 to be physically connected and disconnected from the host 314.

The DSD 316 can include a system processor 302, which may be a programmable controller, and associated memory 304. The system processor 302 may be part of a system on chip (SOC). A buffer 306 may temporarily store data during read and write operations and can include a command queue. The read/write (R/W) channel/preamp/heads 310 can encode data during write operations to, and reconstruct data during read operations from, the data storage medium 308. The data storage medium 308 is shown and described as a hard disk drive, but may be other types of magnetic medium, such as a flash medium, optical medium, or other medium, or any combination thereof.

The R/W channel/preamp/heads 310 may receive data from more than one data storage medium at a time, and in some embodiments can also receive multiple data signals concurrently, such as from more than one output of a reader. Multi-sensor magnetic recording (MSMR) systems can receive two or more inputs from multiple sources (e.g. recording heads, flash memory, optical memory, and so forth) associated with the same magnetic medium. The R/W channel/preamp/heads 310 can combine multiple inputs and provide a single output, as described in examples herein.

The block 318 can implement all of or part of the systems and functionality of systems and methods 100-200, for example, the preamp mode monitoring functionality discussed above. In some embodiments, the block 318 may be a separate circuit, integrated into the R/W channel/preamp/heads 310, included in a system on chip, firmware, software, or any combination thereof.

Many variations would be apparent to one of ordinary skill in the art in view of this disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a preamplifier configured to implement multiple operational modes and configured to be connected to a magnetic read/write head, wherein the magnetic read/write head includes a read sensor to read data from a disk and a write element to write data to the disk;
   the preamplifier including:
      an input configured to receive a test mode control signal to activate a mode monitoring mode of one or more test modes of a test mode circuit of the preamplifier;
      the test mode circuit configured to determine an indicator of a current operational mode of the preamplifier; and
      an output to provide the determined indicator of the current operational mode of the preamplifier.

2. The apparatus of claim 1, further comprising the test mode control signal further indicating a monitored mode of the multiple operational modes to be monitored.

3. The apparatus of claim 2, further comprising the test mode circuit being further configured to determine the indicator of the current operational mode of the preamplifier at least in part by determining whether the current operational mode of the preamplifier is the monitored mode of the multiple operational modes.

4. The apparatus of claim 3, further comprising the test mode circuit being further configured to determine the indicator of the current operational mode of the preamplifier as a logical bit indicative of whether the current operational mode of the preamplifier is the monitored mode of the multiple operational modes.

5. The apparatus of claim 4, further comprising the test mode circuit being further configured to determine whether the current operational mode of the preamplifier is the monitored mode of the multiple operational modes by:
   determining one or more preamplifier operational states corresponding to the monitored mode; and comparing the determined one or more preamplifier operational states corresponding to the monitored mode to one or more respective current operational states of the preamplifier.

6. The apparatus of claim 2, further comprising a test mode register configured to store the monitored mode.

7. The apparatus of claim 1, further comprising a magnetic disk storage device including the preamplifier.

8. The apparatus of claim 1, further comprising:
the preamplifier further including:
a signal processing module configured to:
receive a read signal from the magnetic read/write head including the read data from the head; and
apply a signal processing to the read signal, the signal processing including at least one of bias, gain and bandwidth processing.

9. The apparatus of claim 8, further comprising:
a channel configured to receive the processed signal from the magnetic read/write head, the channel controlling the at least one of the bias, gain and bandwidth processing of the signal processing.

10. A system comprising:
a preamplifier configured to implement multiple operational modes and configured to be connected to a magnetic read/write head, wherein the magnetic read/write head includes a read sensor to read data from a disk and a write element to write data to the disk;
the preamplifier further configured to:
receive a test mode control signal to activate a mode monitoring mode of one or more test modes of a test mode circuit of the preamplifier;
receive a monitored mode of the multiple operational modes to be monitored;
determine, by the test mode circuit, an indicator of a current operational mode of the preamplifier at least in part by determining whether the current operational mode of the preamplifier is the monitored mode of the multiple operational modes; and
output the determined indicator of the current operational mode of the preamplifier.

11. The system of claim 10 further comprising:
the test mode circuit being further configured to determine the indicator of the current operational mode of the preamplifier as a logical bit indicative of whether the current operational mode of the preamplifier is the monitored mode of the multiple operational modes.

12. The system of claim 11 further comprising the test mode circuit being further configured to determine whether the current operational mode of the preamplifier is the monitored mode of the multiple operational modes by:
determining one or more preamplifier operational states corresponding to the monitored mode; and
comparing the determined one or more preamplifier operational states corresponding to the monitored mode to one or more respective current operational states of the preamplifier.

13. The system of claim 11 further comprising:
a test mode register configured to store the monitored mode.

14. The system of claim 10 further comprising:
a magnetic disk storage device including the preamplifier.

15. The system of claim 14 further comprising the preamplifier further including:
a signal processing module configured to:
receive a read signal from the magnetic read/write head including the read data from the magnetic read/write head; and
apply a signal processing to the read signal, the signal processing including at least one of bias, gain and bandwidth processing.

16. The system of claim 15, further comprising:
a channel configured to receive the processed signal from the magnetic read/write head, the channel controlling the at least one of the bias, gain and bandwidth processing of the signal processing.

17. A method comprising:
receiving, by a preamplifier configured to implement multiple operational modes, a control signal indicating a current operational mode for the preamplifier, the preamplifier configured to be connected to a magnetic read/write head, wherein the magnetic read/write head includes a read sensor to read data from a disk and a write element to write data to the disk;
applying, by the preamplifier, a signal processing to a read signal from the read sensor based on the current operational mode;
receiving, by the preamplifier, a test mode control signal to activate a mode monitoring mode of one or more test modes of a test mode circuit of the preamplifier;
receiving, by the preamplifier, a monitored mode of the multiple operational modes to be monitored by the a test mode circuit;
determining, by the test mode circuit, an indicator of the current operational mode of the preamplifier at least in part by determining whether the current operational mode of the preamplifier is the monitored mode of the multiple operational modes; and
outputting, by an output of the preamplifier, the determined indicator of the current operational mode of the preamplifier.

18. The method of claim 17 further comprising
receiving, by the preamplifier, another control signal indicating an updated current operational mode for the preamplifier;
applying, by the preamplifier, a different signal processing to the read signal based on the updated current operational mode;
determining, by the test mode circuit, an updated indicator of the current operational mode of the preamplifier at least in part by determining whether the updated current operational mode of the preamplifier is the monitored mode of the multiple operational modes; and
outputting, by the output of the preamplifier, the determined updated indicator of the current operational mode of the preamplifier.

19. The method of claim 17, further comprising the determining of the indicator of the current operational mode of the preamplifier including:
determining the indicator of the current operational mode of the preamplifier as a logical bit indicative of whether the current operational mode of the preamplifier is the monitored mode of the multiple operational modes.

20. The method of claim 17 further comprising performing the determining of whether the current operational mode of the preamplifier is the monitored mode of the multiple operational modes by:
determining one or more preamplifier operational states corresponding to the monitored mode; and
comparing the determined one or more preamplifier operational states corresponding to the monitored mode to one or more respective current operational states of the preamplifier.

* * * * *